United States Patent
LeBlanc, Sr. et al.

(10) Patent No.: US 7,766,353 B2
(45) Date of Patent: Aug. 3, 2010

(54) WHEEL UNIT FOR AUTOMOTIVE VEHICLES

(75) Inventors: James C. LeBlanc, Sr., Rochester, MI (US); James C. LeBlanc, Jr., Washington, MI (US); Paul D. Bentley, Rochester, MI (US)

(73) Assignee: GPV, LLC, Southfield, MI (US)

( * ) Notice: Subject to any disclaimer, the term of this patent is extended or adjusted under 35 U.S.C. 154(b) by 551 days.

(21) Appl. No.: 10/524,545

(22) PCT Filed: Oct. 3, 2003

(86) PCT No.: PCT/US03/31228

§ 371 (c)(1),
(2), (4) Date: Mar. 8, 2006

(87) PCT Pub. No.: WO2005/042293

PCT Pub. Date: May 12, 2005

(65) Prior Publication Data

US 2006/0237251 A1      Oct. 26, 2006

(51) Int. Cl.
 *B60G 3/18* (2006.01)
(52) U.S. Cl. ............... 280/124.136; 152/417; 180/257; 280/124.139; 280/124.142; 280/124.157
(58) Field of Classification Search .......... 280/124.136, 280/124.138, 124.139, 93.512, 124.142, 280/124.157; 180/257, 256, 263, 254, 370; 152/416, 417
See application file for complete search history.

(56) References Cited

U.S. PATENT DOCUMENTS

| 2,381,672 | A | | 8/1945 | Lee | |
|---|---|---|---|---|---|
| 3,275,391 | A | * | 9/1966 | Blais | ........................ 384/447 |
| 3,476,200 | A | | 11/1969 | Schoepe et al. | |
| 4,172,621 | A | | 10/1979 | Yoshida | |
| 4,372,418 | A | | 2/1983 | Dangel | |
| 4,606,654 | A | * | 8/1986 | Yatsu et al. | ................. 384/447 |
| 4,783,095 | A | | 11/1988 | Rampini et al. | |
| 4,974,872 | A | | 12/1990 | Riese | |
| 5,538,274 | A | | 7/1996 | Schmitz et al. | |
| 6,116,626 | A | | 9/2000 | Cherry et al. | |
| 6,575,269 | B1 | | 6/2003 | Skoff et al. | |
| 7,547,144 | B2 | * | 6/2009 | Kunimoto et al. | ........... 384/447 |

* cited by examiner

*Primary Examiner*—Eric Culbreth
(74) *Attorney, Agent, or Firm*—Novak Druce + Quigg LLP

(57) ABSTRACT

A wheel suspension system for a vehicle having a body supported on a set of wheels each provided with a rim and an axle generally consisting of a lower control arm pivotally connectable to a first portion of such body; an upper control arm pivotally connectable to a second portion of such body; a roller bearing having inner and outer races, disposed within such rim, coaxially relative to the rotational axis of the rim; a steering knuckle mounted on the outer race of the bearing, having a first portion pivotally connected to the lower control arm and a second portion pivotally connected to the upper control arm, defining a steering axis intersecting the rotational axis of the rim; and a hub member mounted on the inner race and connectable to an axle receivable through an opening provided in the steering knuckle.

13 Claims, 14 Drawing Sheets

WHEEL UNIT FOR AUTOMOTIVE VEHICLES

This invention relates to an automotive vehicle and more particularly to a novel wheel unit for such a vehicle. The invention further contemplates a novel wheel suspension system forming a component of such unit.

BACKGROUND OF THE INVENTION

In the prior art, there has been developed a certain type of vehicle designed for a variety of purposes, generally consisting of a body of monocoque construction mounted on a set of wheel units, a power plant mounted in the vehicle body, a drivetrain for transmitting drive from the power plant to the wheel units, a steering system operatively connected to one or more of the wheel units and, often, various auxiliary systems. Because such vehicles are intended to carry a crew, often additional personnel and/or cargo or additional equipment, it is desirable that the compartment space of such vehicles be as large as possible. The mounting and installation of such required units and systems, however, has the effect of intruding upon and thus diminishing the compartment space of such vehicles.

In addition to requiring maximum compartment space, it is desirable that such vehicles be effectively mobile and maneuverable in operation. They must be capable of operating on both ordinary roadways and offroad terrain. They further must be capable of being operated on irregular and sloped terrain and to do so by maintaining as near a level bearing of the vehicle body as possible in order to maintain vehicle control and operate the various systems of the vehicle.

In view of the foregoing requirements of such vehicle, it is the principal object of the present invention to provide a wheel unit for the type of vehicle described which provides all wheel drive for such vehicles, maximum jounce and rebound for negotiating irregular and sloped terrain and minimal intrusion upon the body of the vehicle in order to provide maximum compartment space.

SUMMARY OF THE INVENTION

The present invention achieves its principal objective by providing a wheel unit generally consisting of a wheel including rim and disc portions, upper and lower control arms universally connected to the body of the vehicle, a knuckle plate universally connected to the outer ends of the upper and lower control arms, a roller bearing disposed within the rim portion of the wheel coaxially therewith having an outer race mounted on the knuckle plate and an inner race, a hub member mounted on the inner race of the bearing and rigidly connected to the disc portion of the wheel and a half shaft operatively connected at an inner end to a component of the vehicle drivetrain and an outer end extending through the bearing and connected to the hub member for rotational drive therewith. The bearing is adapted to carry axial, radial and moment loads. The outer end of the half shaft is provided with a pair of Cardan or universal joints disposed within the rim portion of the wheel, and the kingpin axis of the knuckle plate intersects a midpoint of the Cardan joints of the half shaft and includes a portion disposed within the rim portion of the wheel. With such a configuration, the wheel is capable of increased jounce and rebound with correspondingly minimal angularity of the half axle, and may be steered through a minimal steering angle to provide a minimal turning angle without intruding upon the body of the vehicle and thus providing a maximum compartment space for the vehicle.

DETAILED DESCRIPTIONS OF EMBODIMENTS OF THE INVENTION

Figure 1:
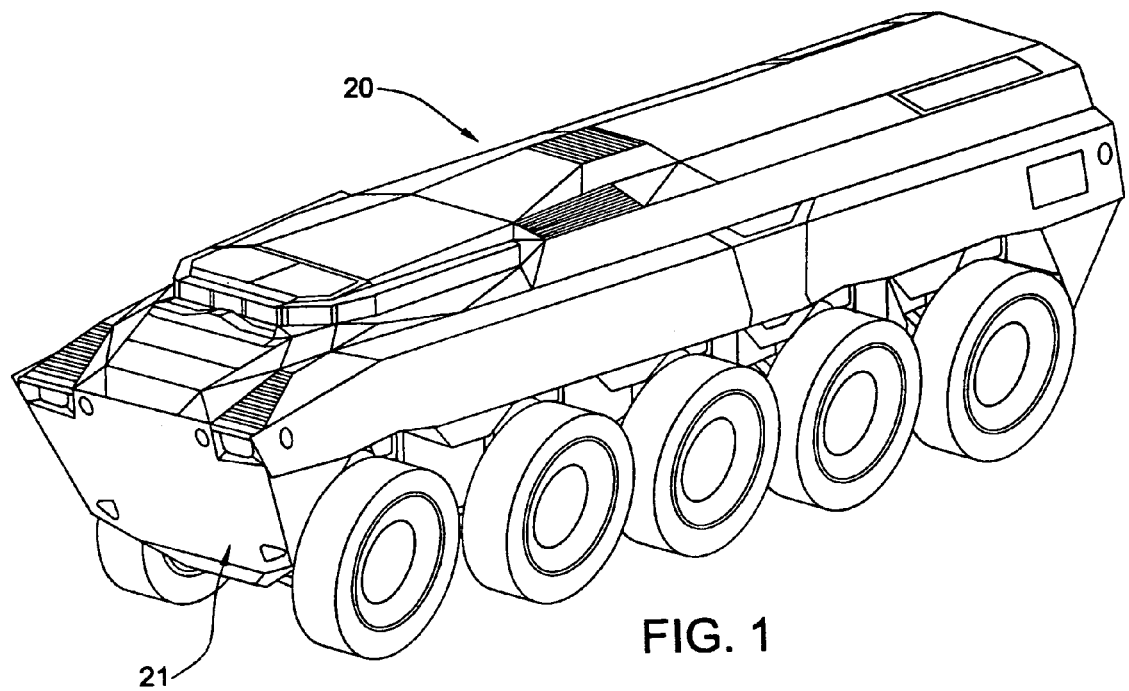
FIG. 1 is a perspective view of an automotive vehicle utilizing at least one set of wheel units each embodying the present invention.
Figure 2:
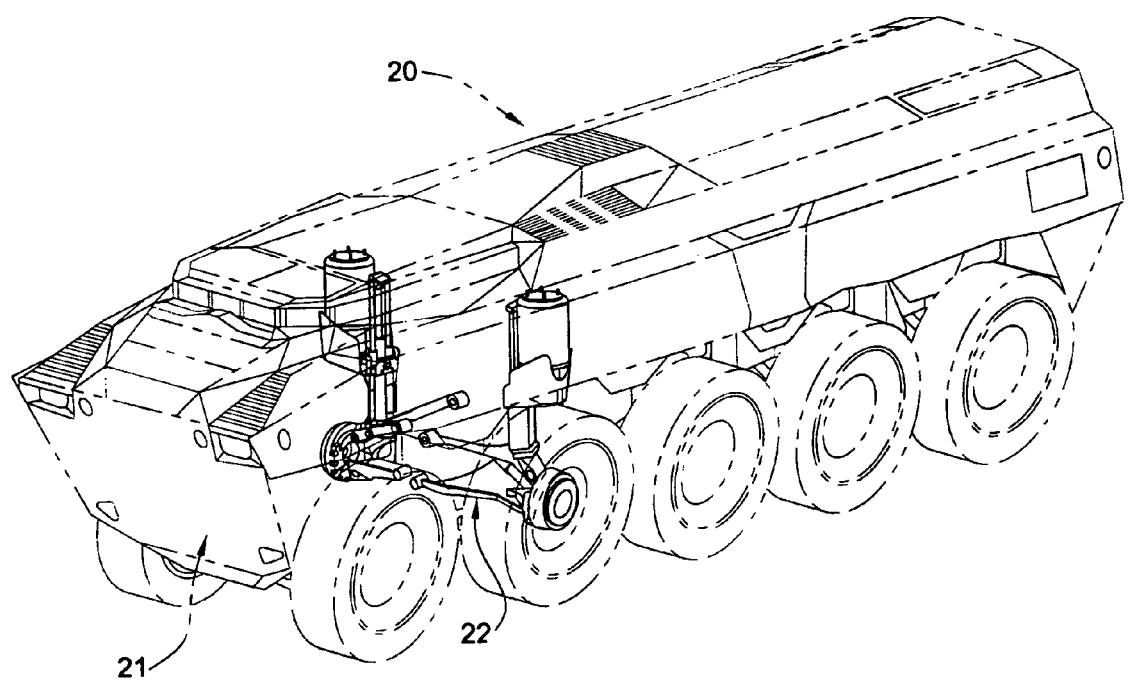
FIG. 2 is a view similar to the view shown in FIG. 1 illustrating the vehicle principally in phantom lines and a pair of wheel units in the second axle position of the vehicle, embodying the present invention, in solid lines.
Figure 3:
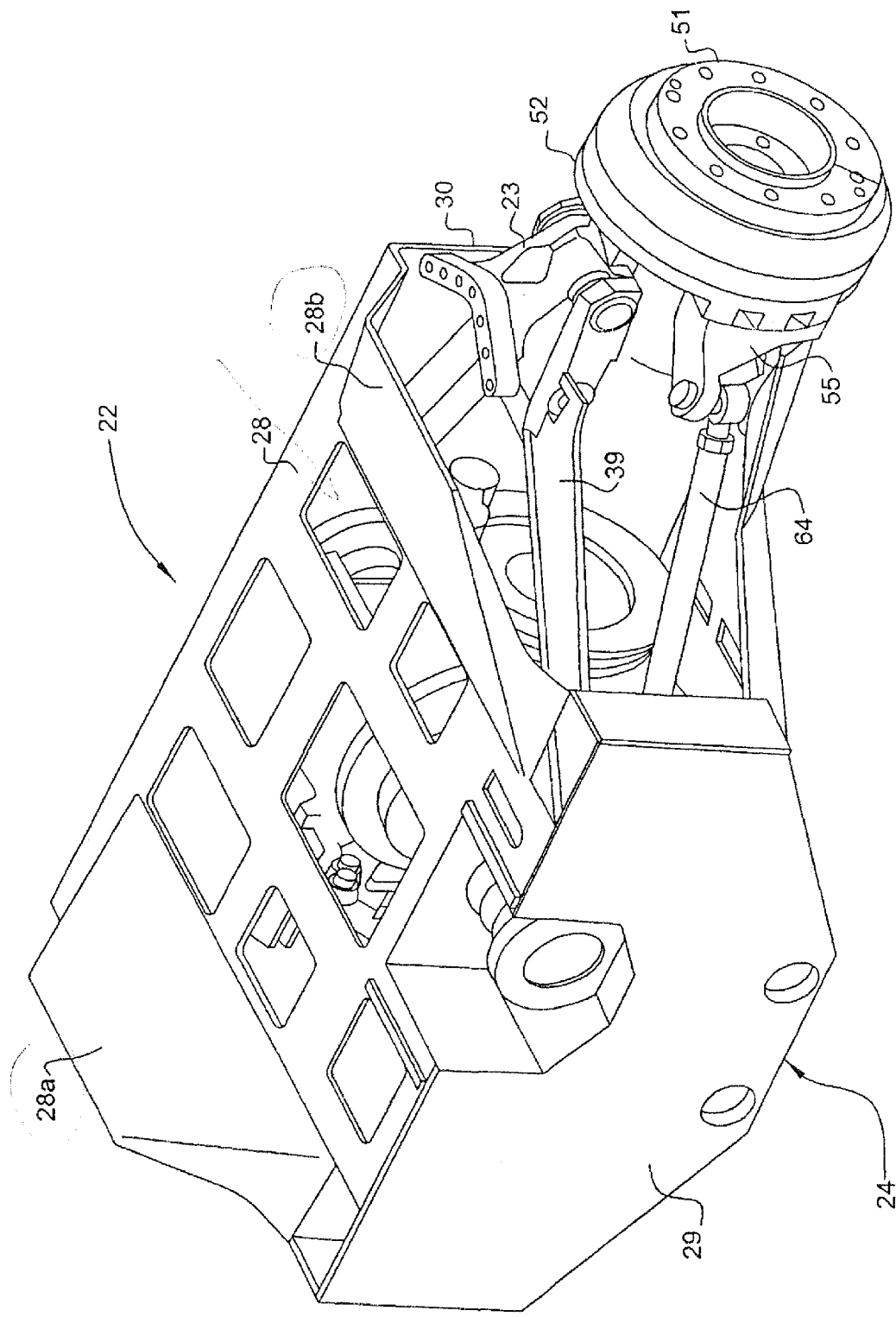
FIG. 3 is an enlarged, perspective view of a portion of the wheel unit shown in FIG. 2, having certain portions thereof removed.
Figure 4:
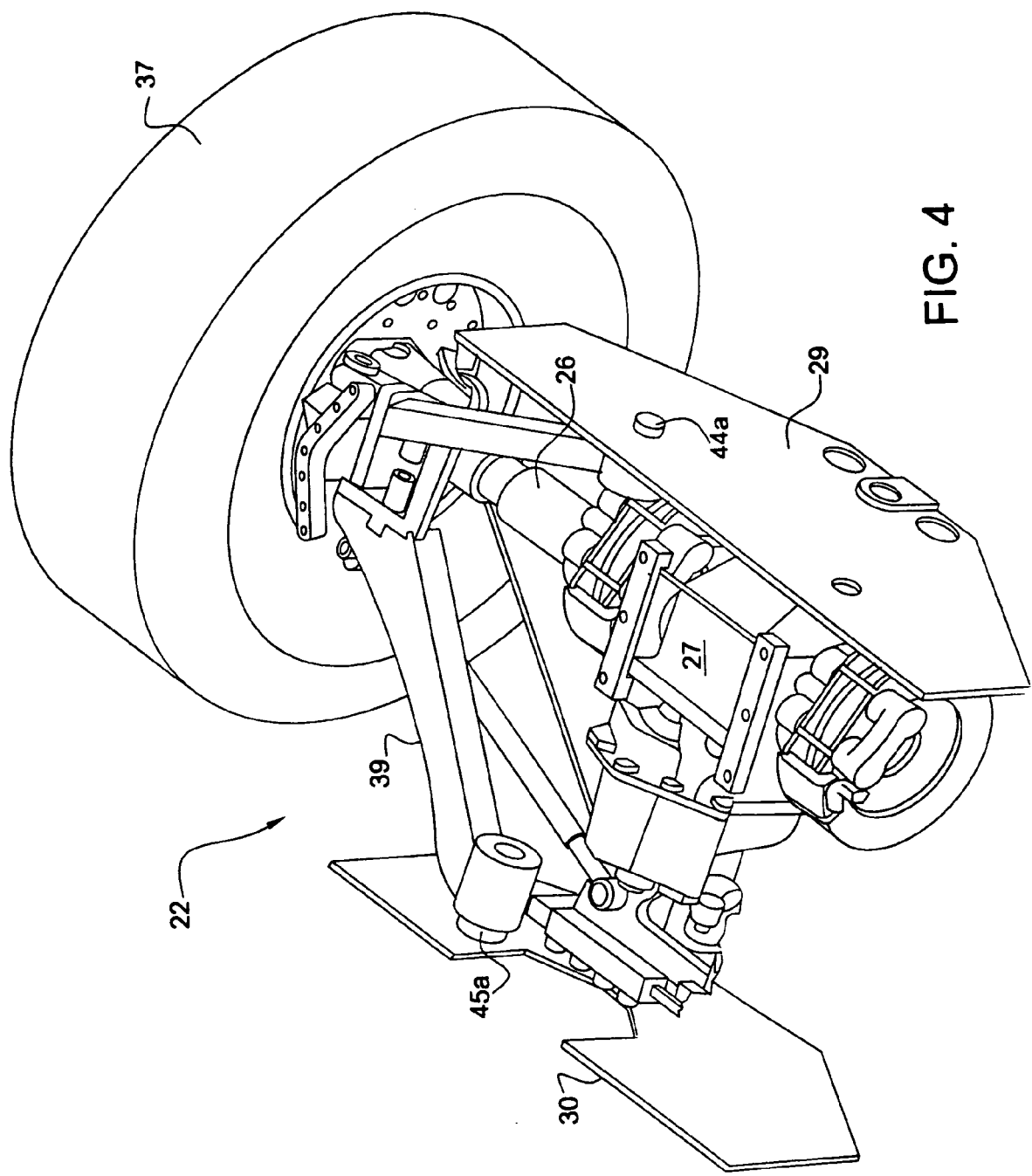
FIG. 4 is a perspective view of a portion of the wheel unit having portions of the support housing and the suspension system removed.

Referring to FIGS. 1 and 2 of the drawings, there is illustrated an automotive vehicle 20 generally consisting of a monocoque body or hull 21 mounted on a set of wheel units 22, a power plant mounted within the body, a drivetrain for transmitting drive from the power plant to the wheel units, a steering system mounted on the body and operatively connected to one or more of the wheel units and various other auxiliary equipment and systems. Although four steerable sets of wheel units are shown, the vehicle may have a 4×4 configuration with a one or both axles being steerable, a 6×6 configuration with the front and rear wheel units being steerable, an 8×8 configuration with one or all of the wheel units being steerable and a 10×10 configuration with one or all but the middle wheel units being steerable.

Wheel unit 22 generally includes a suspension system 23 supported on a section 24 of the vehicle body, a wheel assembly 25 supported on the suspension system and a half axle 26 drivingly interconnecting an output shaft of a carrier 27 of the vehicle drivetrain and the wheel assembly. Body section 24 includes an upper wall member 28, a pair of longitudinally spaced, transversely disposed wall members 29 and 30 forming a transverse recess in the bottom of the hull, communicating at the ends thereof with wheel wells of the body. The lateral ends of the upper wall member 28 are angled upwardly as at 28a and 28b to accommodate the angular displacement of the half shafts of the wheel units as will later be described. Carrier 27 is disposed in the bottom wall recess, on the longitudinal centerline of the vehicle and depends from and is bolted to the upper wall member 28. It includes a conventional or locking differential, a longitudinal disposed input shaft drivingly connected to the drivetrain of the vehicle, possibly an output shaft aligned with the input shaft depending upon the actual position of the unit within the vehicle and a pair of laterally projecting output shafts schematically shown. In a vehicle configuration in which the wheel units are the foremost wheel units, the carrier will include only a rearwardly disposed input shaft connected to the drivetrain of the vehicle. In a configuration where the wheel units are the rearward most units of the vehicle, the carrier will have a front input shaft. In configurations where the wheel units are intermediate units, the carrier will include both longitudinally aligned input and output shafts. In the units illustrated, the carrier includes an input shaft, a longitudinally aligned output shaft and a pair of laterally projecting output shafts.

Wheel assembly 25 is of a conventional construction including a wheel 34 having a rim portion 35 and a disc portion 36. A tire 37 is mounted on the rim portion of the wheel in the conventional manner. Half axle 26 is operatively connected at an inner end thereof to an output shaft of the carrier and is drivingly connected to the wheel unit in a manner as will be later described.

Suspension system 23 includes a lower control arm 38, an upper control arm 39, a knuckle plate 40, a support strut 41, an air spring 42 and a shock absorber 43. Lower control arm 38 has a substantially triangular panel configuration and is universally connected at two corners thereof to transverse wall members 29 and 30 of the vehicle body as at 38a and 38b. Such panel further is dished both longitudinally and transversely so as to prevent ground matter from being thrown up onto the operating components of the unit, and further to facilitate the travel of the vehicle when the wheels become sunk in soft soil, mud, sand or water. Upper control arm 39 has a V-shaped configuration including a pair of arm sections 44 and 45 universally connected at their inner ends thereof to the transverse wall members of the vehicle hull as at 44a and 45a.

Referring to FIGS. 6 through 10 and 14, there is disposed within rim portion 35 of the wheel, an axle end assembly including knuckle plate 40, a roller bearing 50, a hub 51 and a retainer housing 52. Knuckle plate 40 has a substantially annular configuration including diametrically opposed projecting portions 53 and 54 and a knuckle bracket 55. Upper protruding portion 53 is universally connected to a mounting bracket 56 by means of a ball joint connection 57, which in turn is pivotally connected to a pair of spaced arm portions 58 and 59 of the upper control arm by means of a set of pins 60 and 61 having a centerline passing through the center of ball joint connection 57. Lower protruding portion 54 is universally connected to the outer end of lower control arm 38 by means of a ball joint connection 62. Ball joint connections 57 and 62 define a kingpin axis 63, at least the lower end of which is disposed within rim portion 35 of the wheel. Knuckle bracket 55 also is universally connected to the outer end of a tie rod 64. In the conventional manner, knuckle plate 40 will be caused to displace vertically relative to the body of the vehicle as the upper and lower control arms pivot about horizontal axes, and will swivel about the kingpin axis as tie rod 64 is displaced inwardly and outwardly. The inclination of the kingpin axis is at an angle in the range of 7° to 9° relative to the vertical.

Hub 51 has an annular configuration including a protruding annular portion 70. Roller bearing 50 includes an inner race 71, and outer race 73 and a set of crossed cylindrical rollers 74. The inner race receives hub portion 70 therein and is secured to the hub by means of a set of bolts 72. The outer race of the bearing is caused to be fixed to the knuckle plate and the inner race of the bearing secured to the hub is free to rotate with the hub, by means of retainer housing 52 which encompasses the bearing and hub and is secured to the knuckle plate by means of a set of bolts 75 to clamp the outer race of the bearing between the knuckle plate and the retainer housing. Hub portion 36 of wheel 34 is coaxially mounted on disc 51 by means of a set of studs 76.

Figure 5:
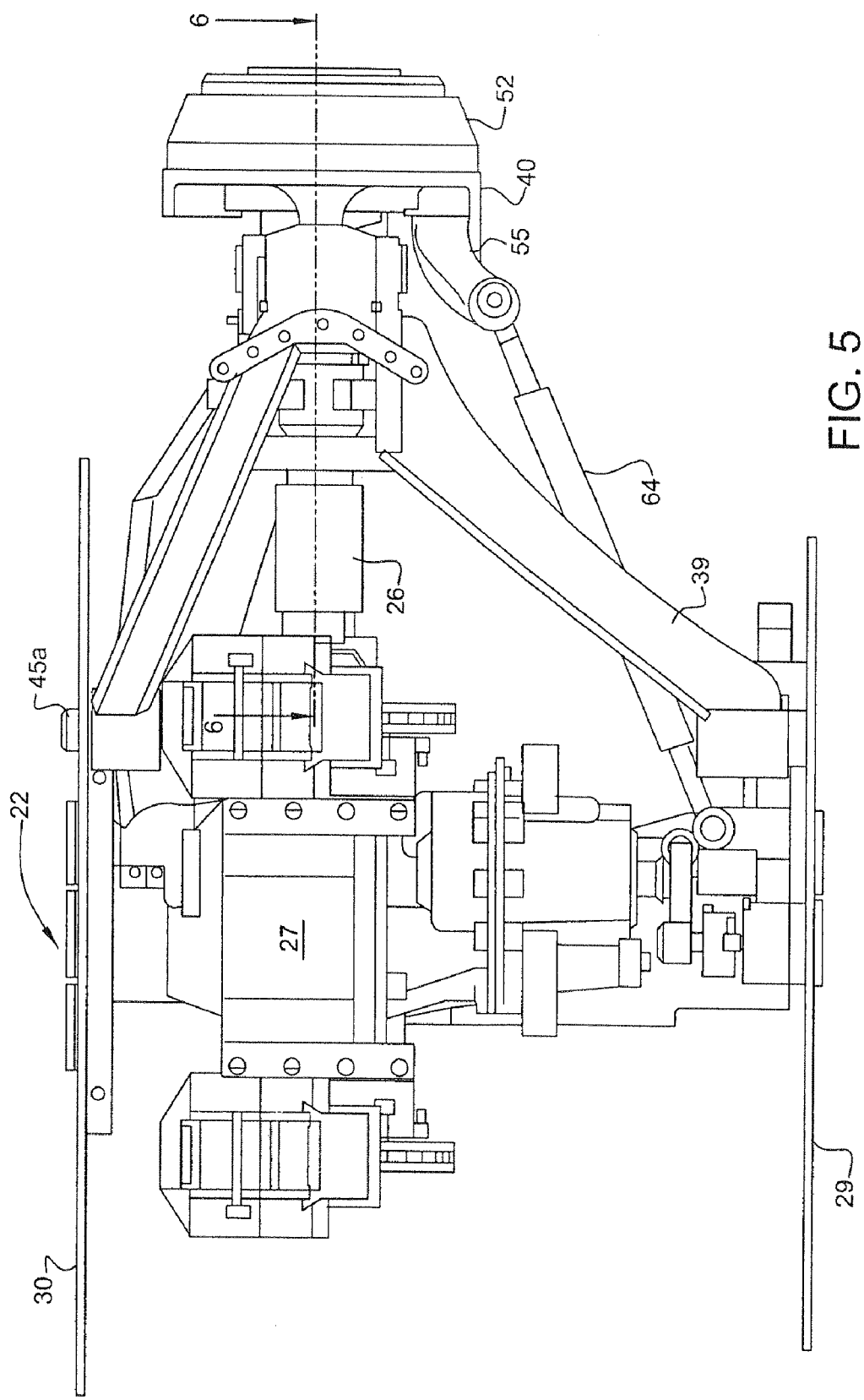
FIG. 5 is a top plan view of a portion of the wheel unit shown in FIGS. 3 and 4.
Figure 6:
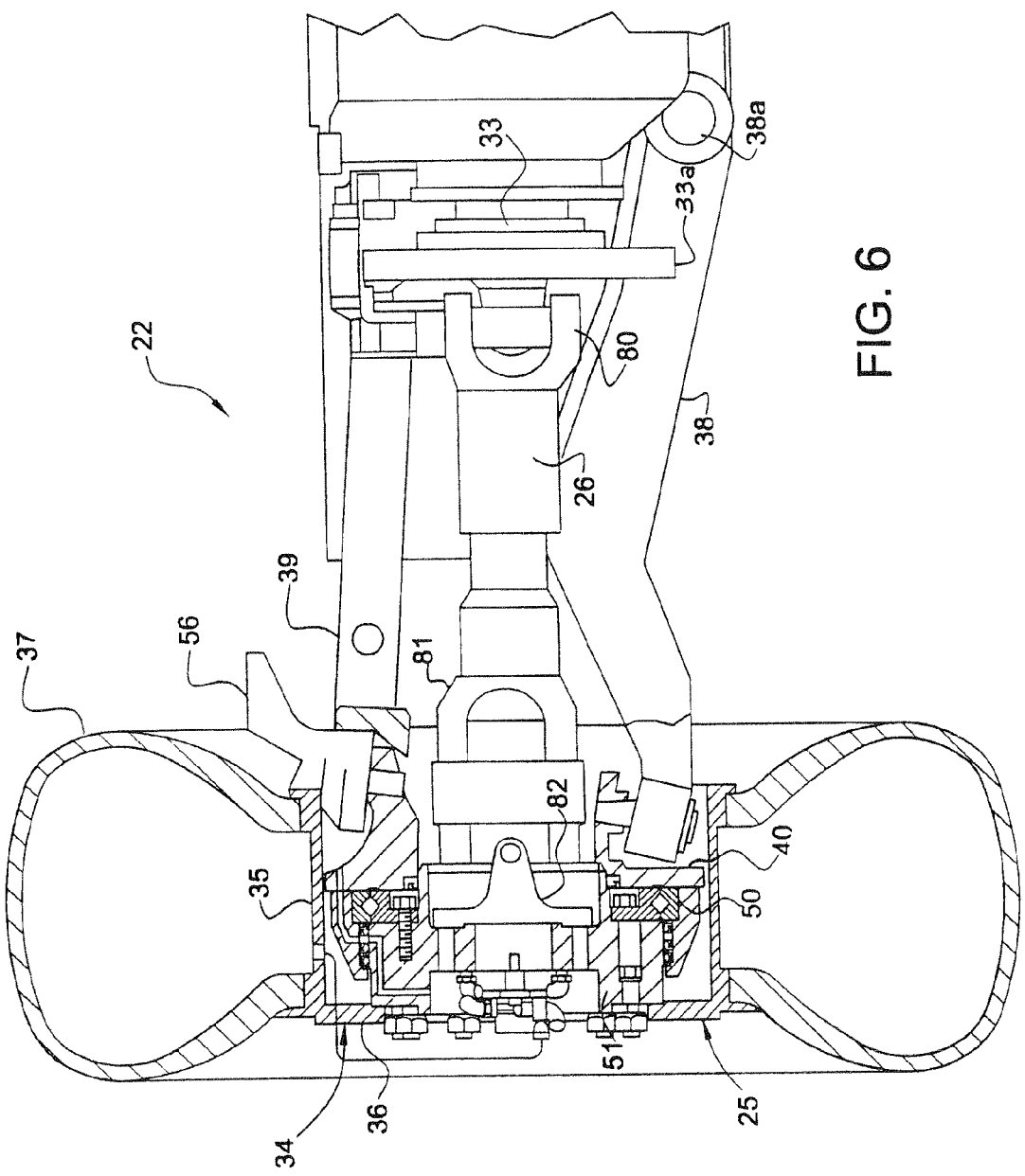
FIG. 6 is an enlarged, vertical cross-sectional view taken along line 6-6 in FIG. 5, having a tire mounted thereon.
Figure 7:
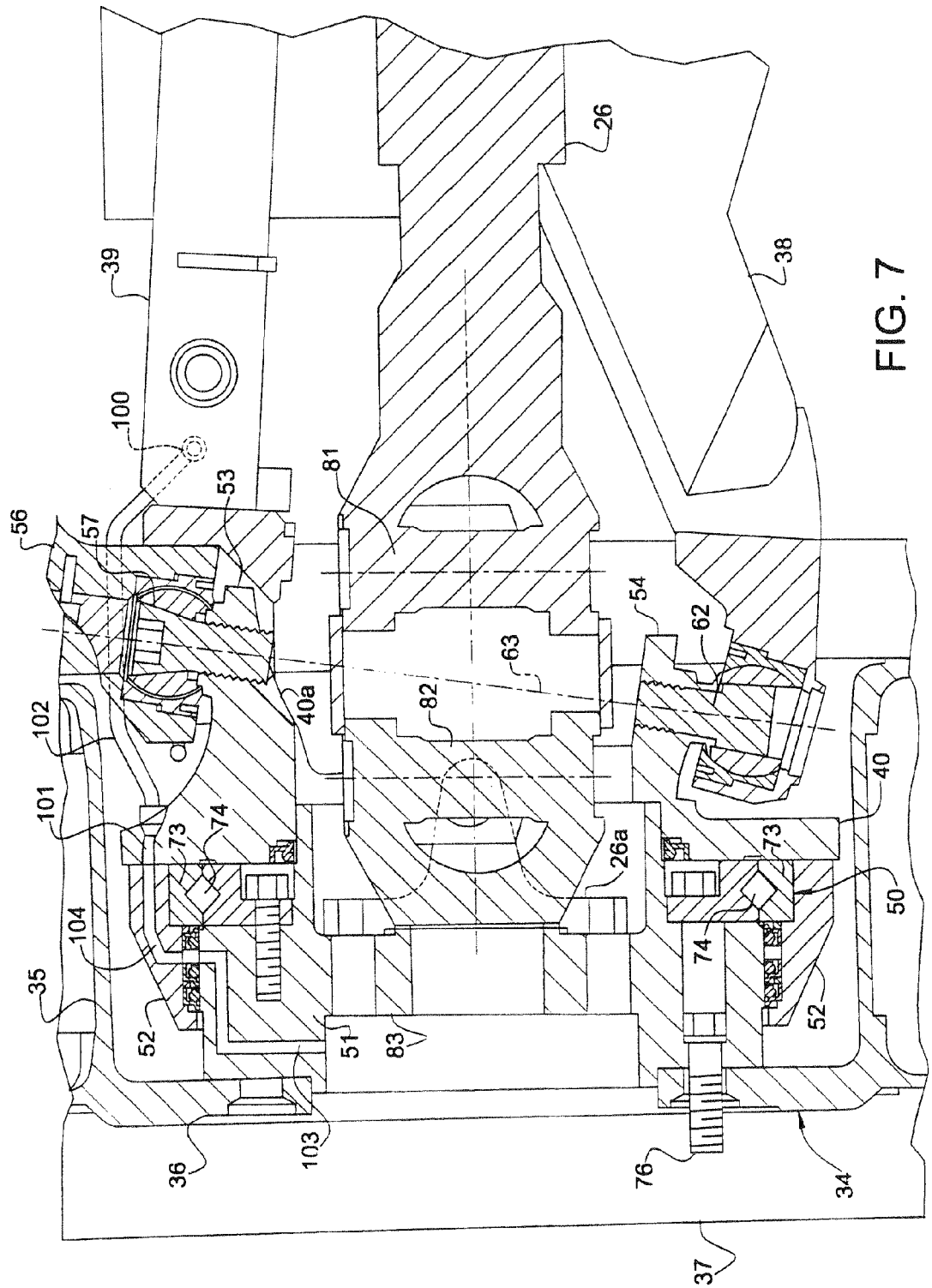
FIG. 7 is an enlarged, cross-sectional view of the connection of a half axle to the wheel of the unit.

Referring to FIGS. 5 through 7, half shaft 26 drivingly interconnects stub shaft 33 and hub 51. It is connected at an inner end thereof to output shaft 33 by means of a universal connection or Cardan joint 80 or a pair of Cardan joints and is provided with a pair of Cardan joints 81 and 82 adjacent the outer end thereof. Such outer end of the shaft is received through opening 40a of the knuckle plate and annular portion 70 of hub 51, and secured coaxially to the hub. The outer end of half shaft 26 is provided with an annular flange 26a which is bolted to an annular portion 83 of the hub. In such arrangement, drive is transmitted from output shaft 33 through half shaft 26 and hub 51 to wheel 34. Braking of the wheel is provided by a disc brake 33a mounted inboard on carrier 27 and operatively connected to output shaft 33. Mounting the disc brakes inwardly adjacent the carrier not only lessens upsprung mass at the wheel but results in less congestion at the wheel and facilities access to the brake for repair and replacement without the need to remove the wheel.

The components of the axle end assembly consisting of the knuckle plate, the hub, the bearing with the outer race thereof fixed to the knuckle plate and the inner race thereof fixed to the hub and the retainer housing fixed to the knuckle plate, clamping the outer race of the bearing against the knuckle plate and encompassing the hub and bearing, are coaxially disposed and confined within the rim portion of the wheel. In addition, the kingpin axis intersects the midpoint of Cardan joints 81 and 82, and at least a lower portion of the kingpin axis also is disposed within the rim portion of the wheel. With such arrangement, the half shaft is free to displace vertically and angularly about the kingpin axis to permit the vehicle to traverse irregular and sloped terrain and steer while transmitting drive and braking to the wheel.

The roller bearing functions to carry axial, radial and moment loads. In the embodiment shown in FIGS. 6 through 10, it is provided with raceways in the inner and outer races thereof which are inclined at an angle of 45° relative to the axis of the bearing, between which the cylindrical rollers are arranged alternately at 90° to each other. The diameter of the rollers is larger than their length. Such bearing is functional to accommodate radial and axial loads acting in both directions, and also tilting moments.

Figure 9A:
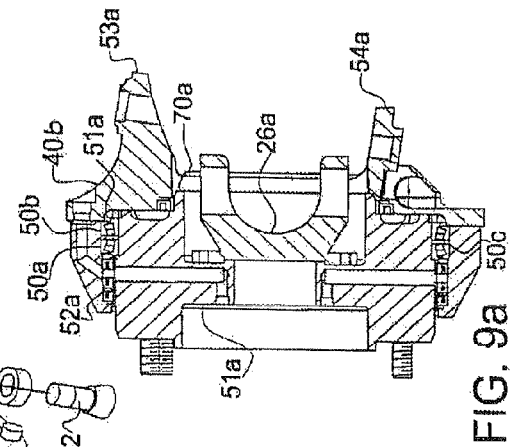
FIG. 9a is a view similar to the view shown in FIG. 9, illustrating another embodiment of the axle end assembly.
Figure 8:
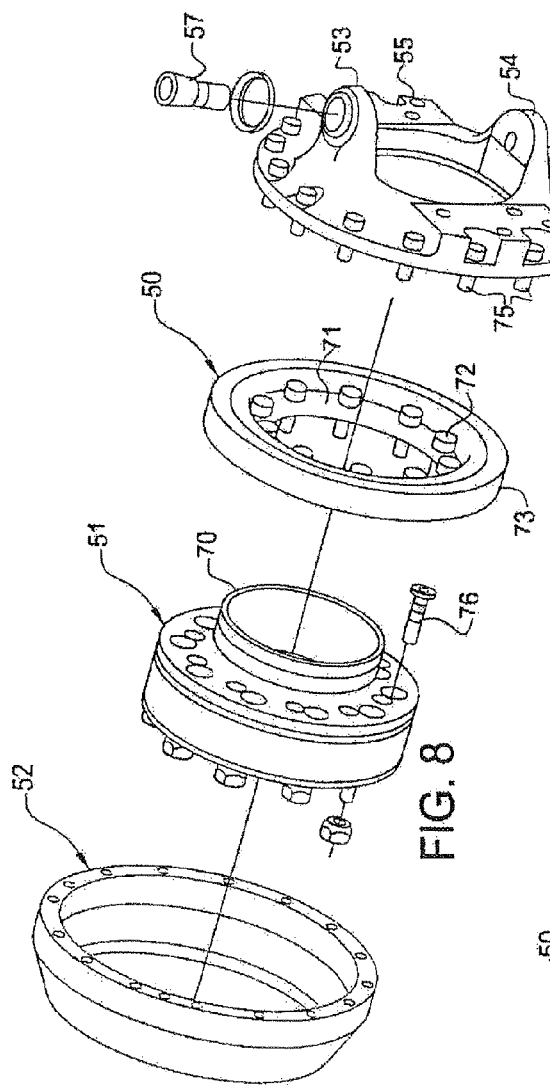
FIG. 8 is an exploded view of the axle end assembly utilized in the wheel unit shown in FIGS. 1 through 7.
Figure 10:
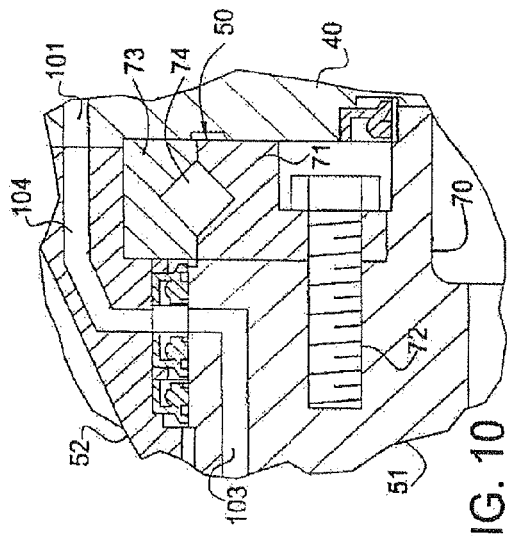
FIG. 10 is an enlarged, fragmentary view of a portion of the assembly shown in FIG. 9.
Figure 9:
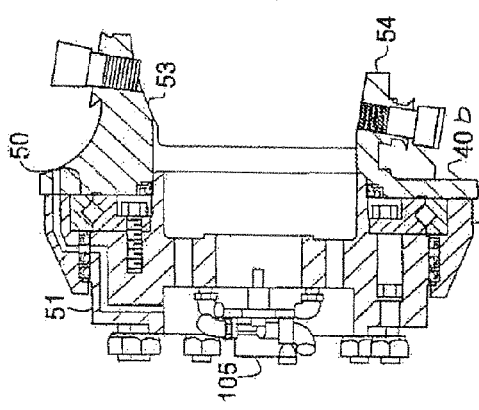
FIG. 9 is a vertical cross-sectional view of the assembly shown in FIG. 8, assembled.

Alternatively to the axle end assembly shown in FIG. 9 utilizing a crossed cylindrical roller bearing, an assembly as shown in FIG. 9a may be used utilizing a pair of tapered bearings. Such assembly includes a knuckle plate 40b comparable to knuckle plate 40, a hub 51a comparable to hub 51, having an annular portion 70a receivable within the opening in the knuckle plate, a pair of tapered roller bearings 50a and 50b separated by a spacer 50c and having the inner races thereof mounted on an annular outer surface of the hub with the inner race of bearing 50a engaging a shoulder provided on the hub, and an annular retainer housing 52a encompassing hub 51a and bearings 50a and 50b, engaging the outer race of bearing 50a and secured to knuckle plate 40a by means of a set of bolts. The clamping action of retainer housing 52a functions to maintain the outer races of bearings 50a and 50b fixed to the knuckle plate while permitting the inner races thereof to rotate with the hub. The inner races of bearings 50a and 50b are secured to hub 51a by a nut. The outer end of a half shaft 26 is disposed coaxially with and secured to hub 51a by means of a set of bolts. In operation, the assembly shown in FIG. 9a functions in the same manner as the assembly shown in FIG. 9 with the knuckle plate being free to displace vertically and swivel about the kingpin axis, and the half shaft transmitting drive through hub 51a to a wheel mounted thereon in the manner as previously described.

Figure 11:
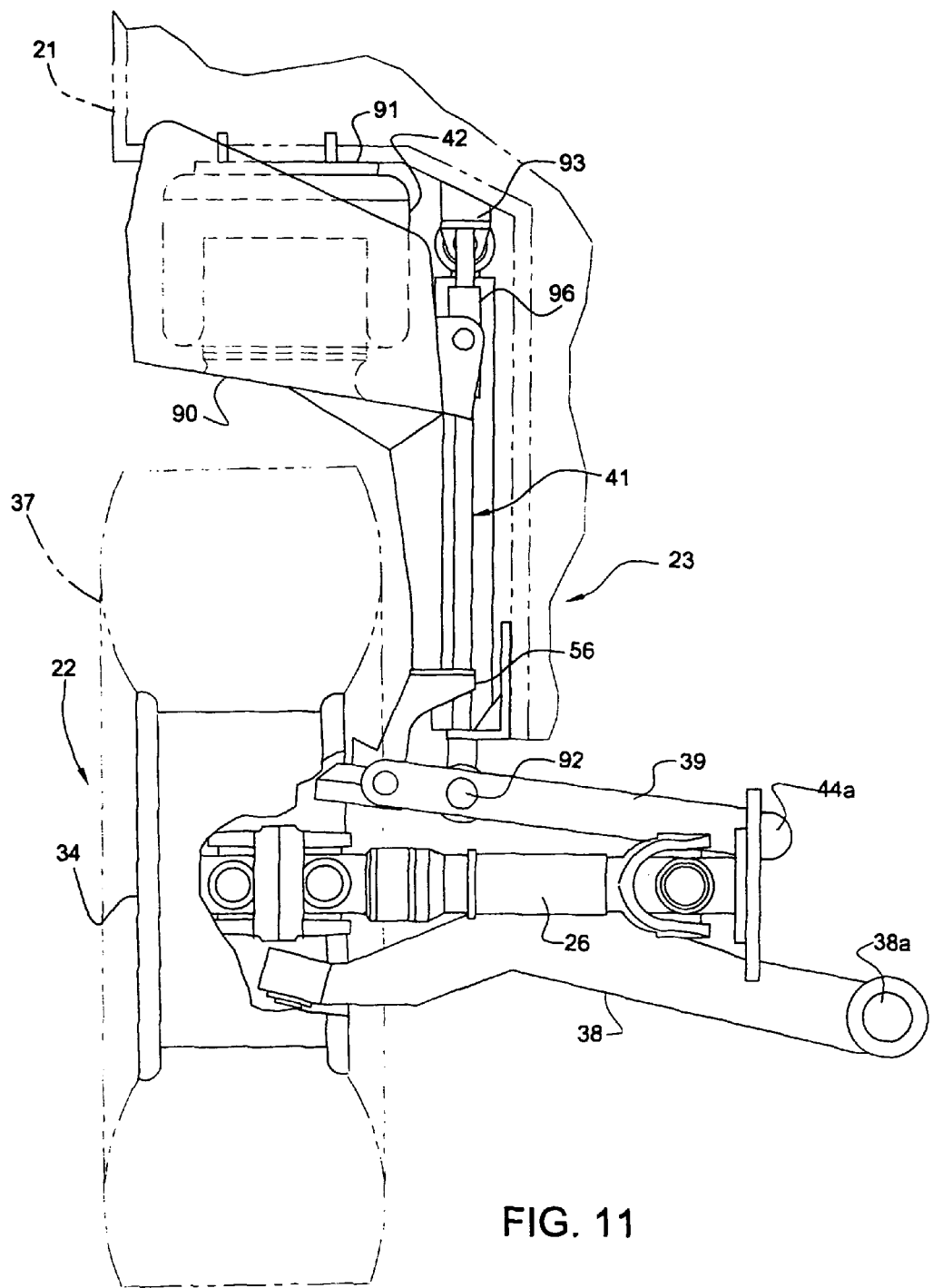
FIG. 11 is a side elevational view of the wheel unit including components of the suspension system.
Figure 12:
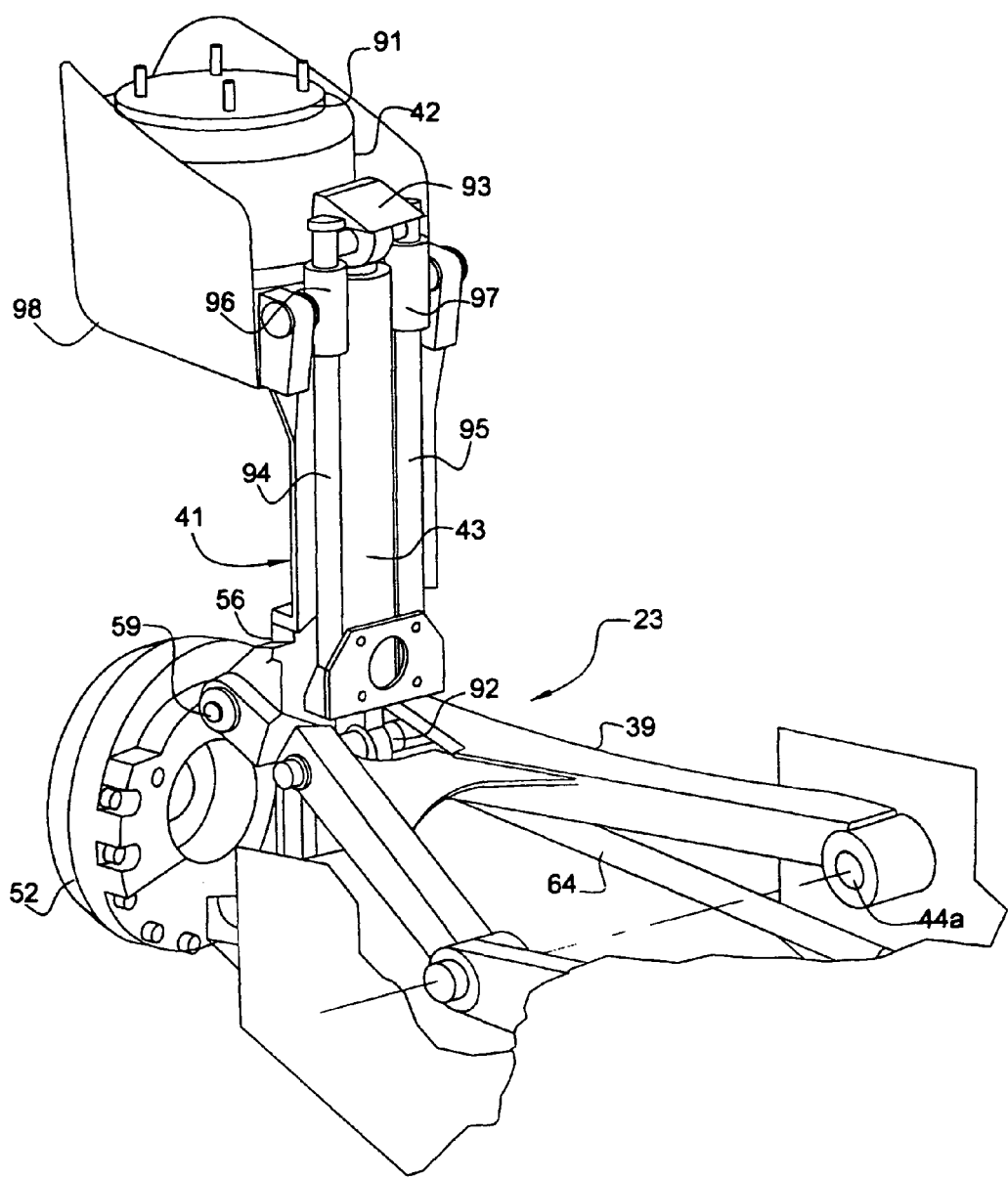
FIG. 12 is a perspective view of a portion of the wheel unit, illustrating the wheel suspension portion thereof in an onroad condition.
Figure 13:
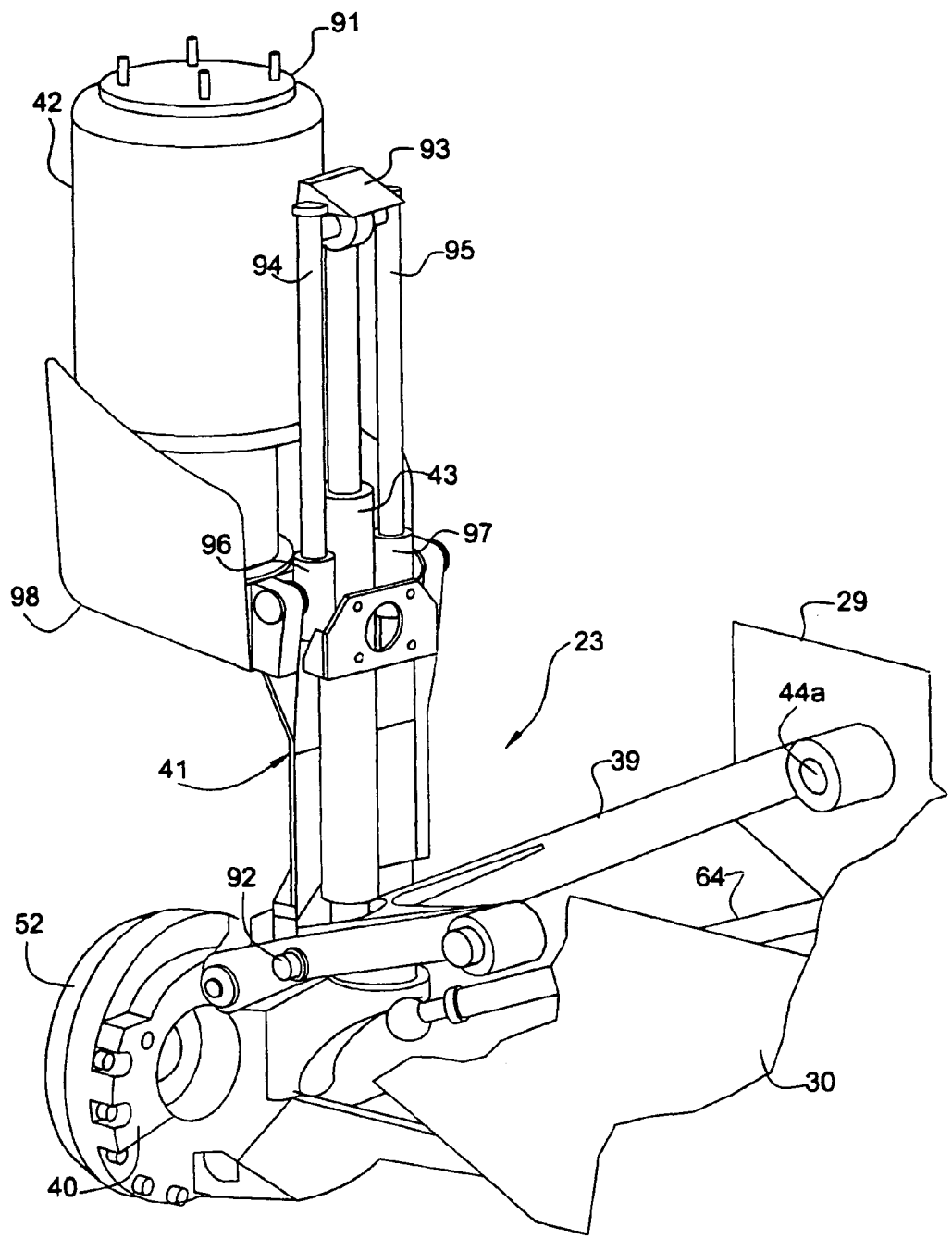
FIG. 13 is a view similar to the view shown in FIG. 12, illustrating the suspension system thereof in full rebound condition.
Figure 14:
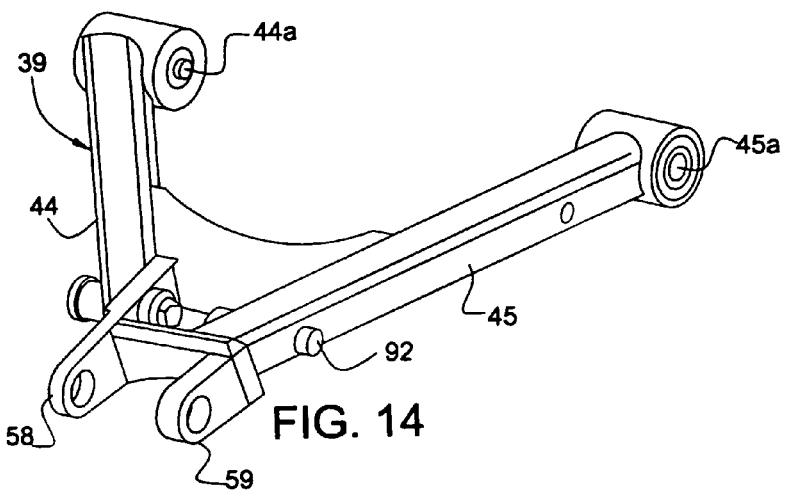
FIG. 14 is a perspective view of an upper control arm of the wheel unit.
Figure 15:
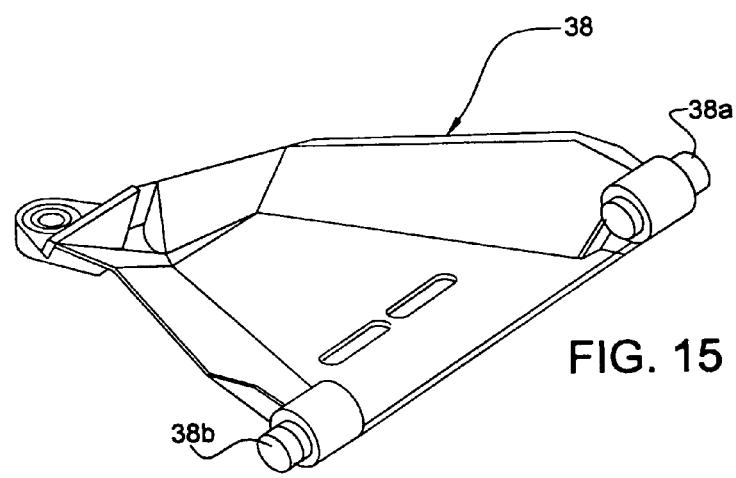
FIG. 15 is a perspective view of a lower control arm of the wheel unit.
Figure 16:
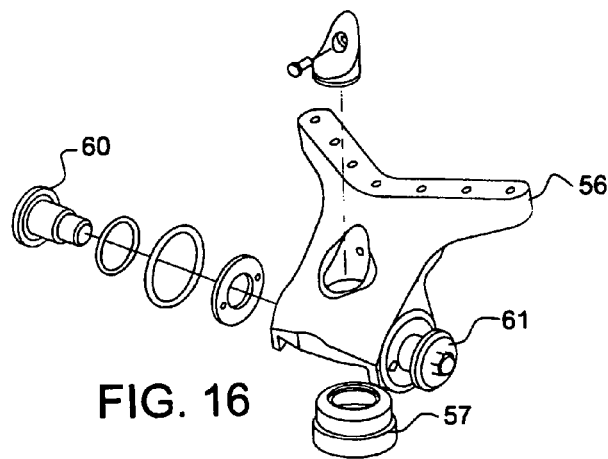
FIG. 16 is a perspective view of a lower support bracket of the suspension system shown in partially exploded relation.

As best seen in FIGS. 11, 12 and 13, support strut 41 is rigidly connected at the lower end thereof to mounting bracket 56 and is provided at an upper end thereof with a laterally projecting support ledge section 90 on which air spring 42 is seated and rigidly attached. The air spring is of a conventional construction and includes an upper plate member 91 which is bolted, welded or otherwise rigidly secured to the underside of the vehicle body within the wheel well. Shock absorber 43 also is of a conventional construction, pivotally connected at a lower end thereof to a connecting pin 92 in the upper control arm and pivotally connected at an upper end thereof to a bracket 93 rigidly secured to the underside of the vehicle body within the wheel well. Also connected at their upper ends to attachment plate 93 is a set of rods 94 and 95 disposed parallel to the piston portion of the shock absorber and guided in a set of bushings 96 and 97 supported on support strut 41. To protect the air spring, support ledge 90 is provided with a curved guard 98 having a sufficient height to completely shield the air spring when the air spring is in an onroad condition as shown in FIGS. 11 and 12.

To assemble the wheel unit as described, with the body of the vehicle sufficiently elevated, the inner ends of the upper and lower control arms are first connected to the vehicle and the half shaft is connected to the output shaft of the carrier. With mounting bracket 56 mounted on the upper control arm, support strut 41 with air spring 42 mounted thereon is inserted in the wheel well, the lower end of the support strut is bolted to mounting bracket 56 and upper plate 91 of the air spring is bolted to the vehicle. Shock absorber 43 is then connected between the upper control arm and the underside of the vehicle within the wheel well. Knuckle plate 40 is then inserted into the wheel well and connected to the upper and lower control arms, allowing the free end of the half shaft to be received through the opening in the knuckle plate. Roller bearing 50 is then mounted on hub 51 and hub 51 with bearing 50 mounted thereon is placed within the wheel well and mounted in the knuckle plate. The hub and bearing thus installed are secured in position by mounting the retainer housing and securing it to the knuckle plate so that the outer race of the bearing will be interposed between the retainer housing and the knuckle plate and the inner race of the bearing will be secured to the hub for rotation therewith. The outer end of the half shaft then is secured to the by bolting end flange 26a to annular hub portion 83. Wheel 34 may then be positioned coaxially against the exposed end of hub 51 and secured thereto by means of a set of bolts 76. Assuming the wheel unit is a steerable unit, the installation of the unit would be completed by connecting the knuckle bracket of the knuckle plate to tie rod 64 of the steering system of the vehicle.

Figure 17A:
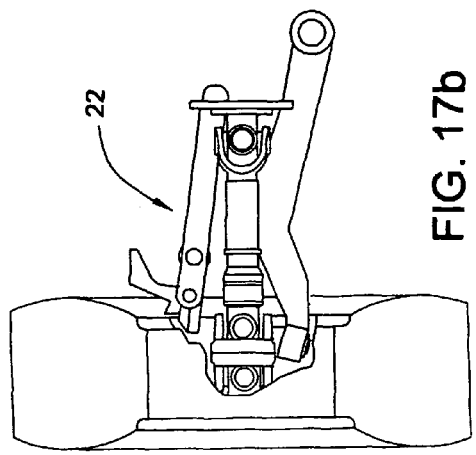
FIGS. 17a through 17d are diagrammatic, side elevational views of a portion of the wheel unit, illustrating the unit in full jounce, onroad, offroad and full rebound conditions.
Figure 17B:
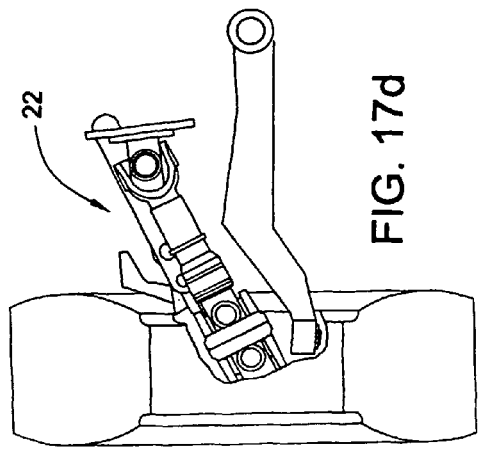
Figure 17C:
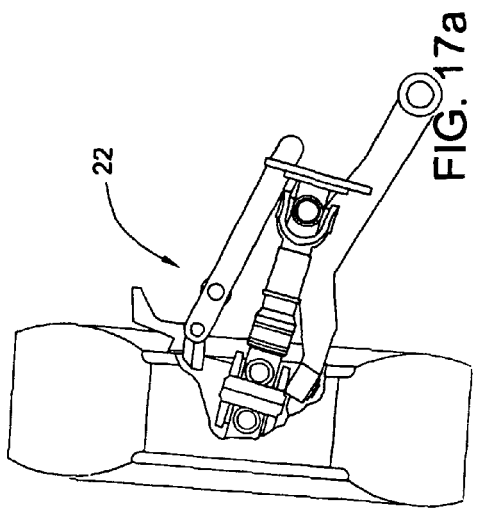
Figure 17D:
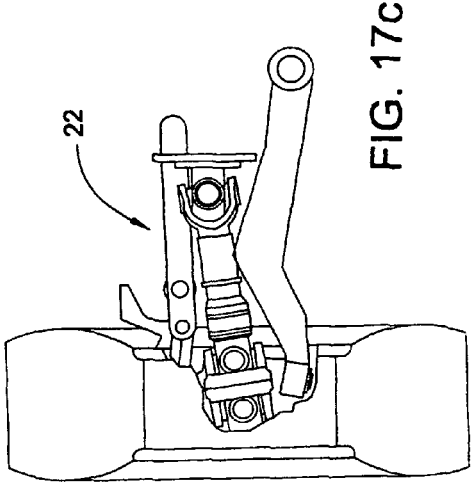
Figure 19:
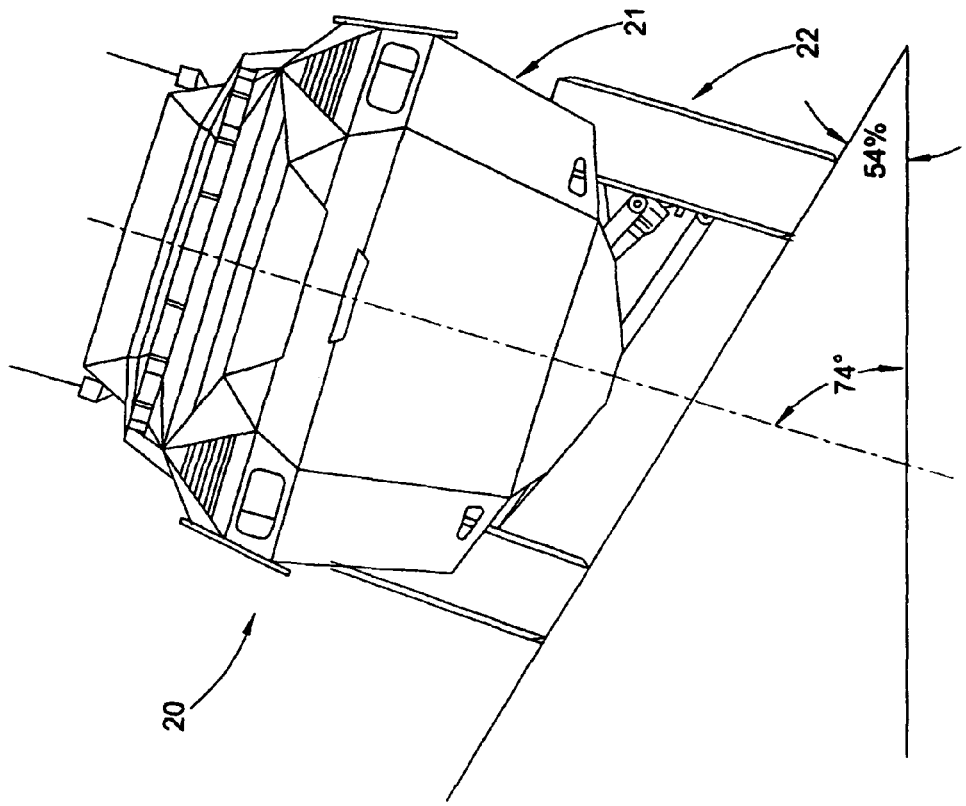
FIG. 19 illustrates a vehicle equipped with wheel units embodying the present invention negotiating a sloped terrain.
Figure 18:
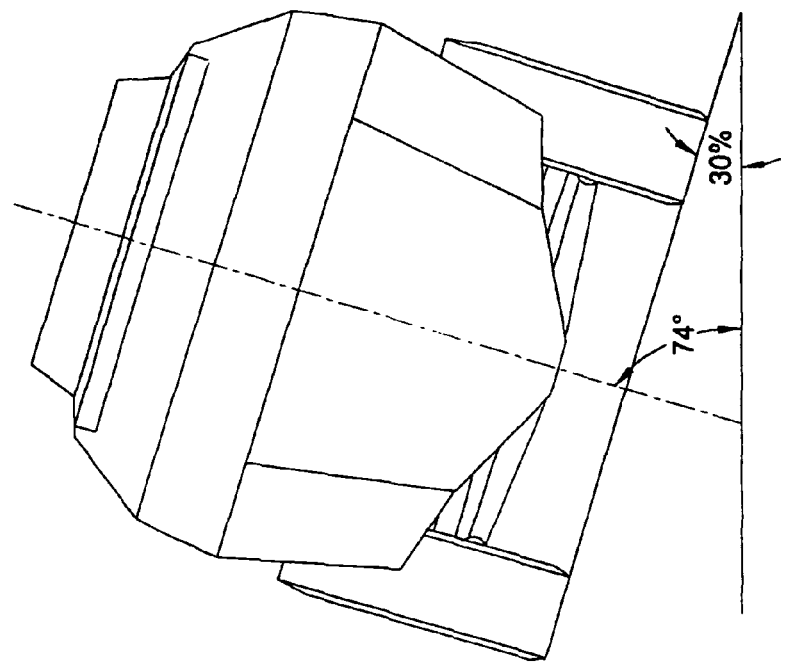
FIG. 18 illustrates a comparable vehicle of the prior art negotiating a sloped terrain.

FIG. 17a is a diagrammatical view illustrating the wheel unit in a full jounce condition. FIG. 17b illustrates the unit in an onroad condition. FIG. 11c illustrates the unit in an off highway condition and FIG. 11d illustrates the unit in a full rebound condition. FIG. 18 illustrates the orientation of a prior art vehicle inclined at a 74° angle, negotiating a 30% slope. FIG. 19 illustrates a vehicle equipped with wheel units of the type described, maintaining a substantially similar body orientation inclined at a 74° angle while negotiating a 54% slope. It will be appreciated that the wheel units of the present invention allow the vehicle to negotiate a slope of nearly twice the angle than that of a comparable prior art vehicle while maintaining the same orientation.

For traversing different terrain and also for operating the vehicle on soft ground, it often is desirable to be able to vary the amount of inflation of the tires of the vehicle. For this purpose, a fluid passageway is provided intercommunicating a source of air under pressure on the body of the vehicle and each of the tires of the vehicle. With respect to the wheel unit described, such passageway includes a passageway in upper control arm 39 communicating with a fixture 100 mounted on the outer, upper end of the upper control arm, a passageway 101 in knuckle plate 40, a hose 102 intercommunicating fixture 100 and passageway 101, an annular groove and a passageway 103 in hub 51, a passageway 104 intercommunicating passageways 101 and 103, a valve 105 (FIGS. 6,7, and 9) communicating with passageway 103, and a hose intercommunicating valve 105 and a port in the rim portion of the wheel communicating with the interior of the tire. Valve 105 is of a type that may be actuated to open or close by transmitting bursts of air through the passageway as described. Suitable controls are provided in such passageway to supply air under pressure to inflate such tires and to vent such passageway to deflate the tire. Because of their positioning, such passageways can be larger than comparable passageways in prior art vehicles and thus are capable of providing larger volumes of air for faster reaction times.

Figure 20:
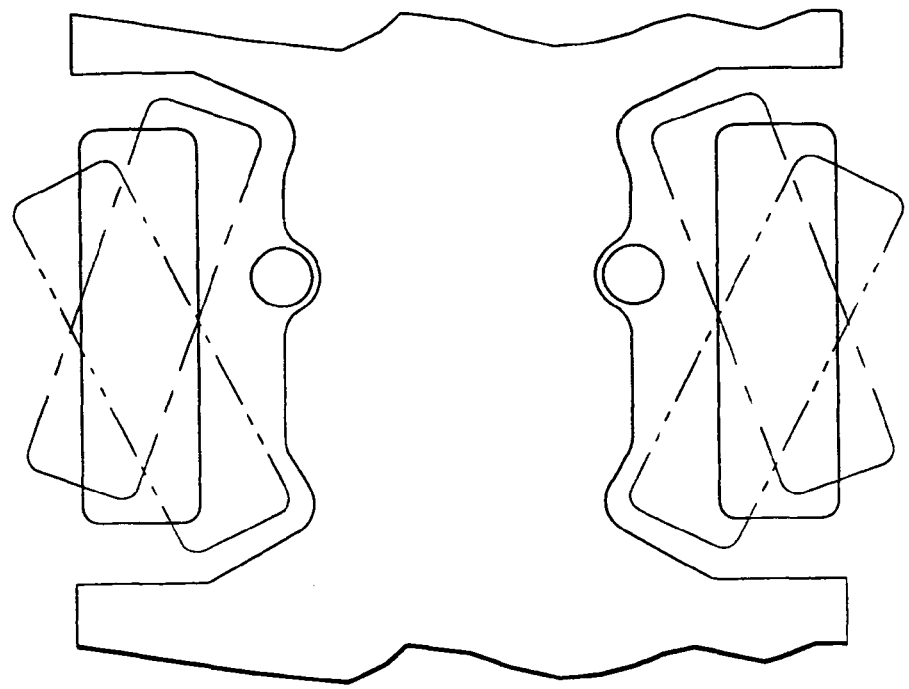
FIG. 20 is a diagrammatic view illustrating wheel units of the prior art with the straight running positions of the wheels shown in solid lines and the turning positions of the wheels shown in phantom lines.
Figure 21:
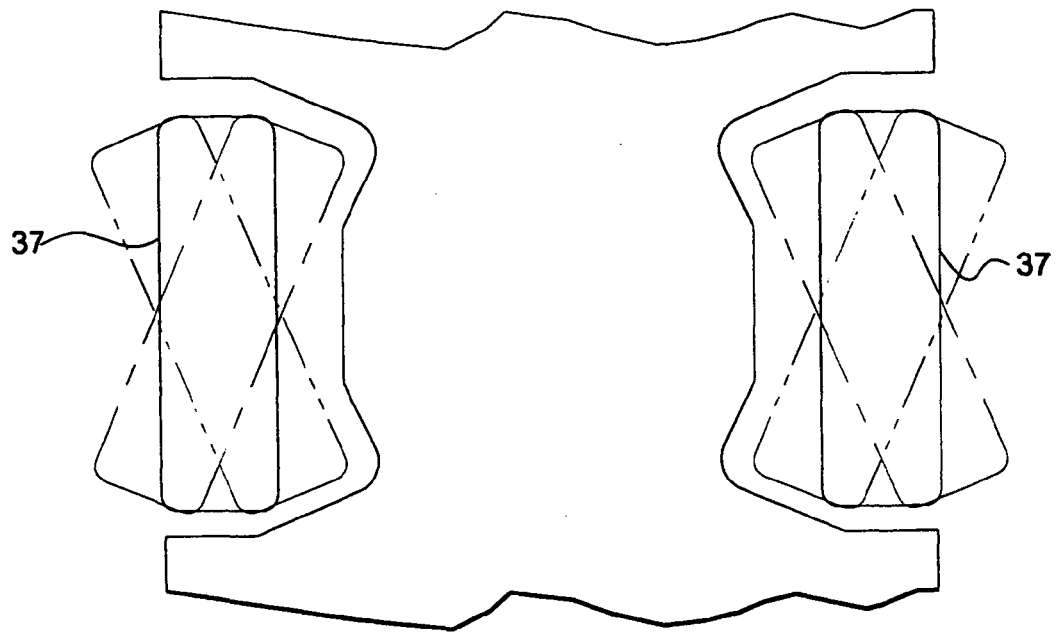
FIG. 21 is a diagrammatic view of wheel units of the present invention with the straight running positions of the wheels shown in solid lines and the turning positions of the wheels shown in phantom lines, providing a comparison relative to the wheel units shown in FIG. 20 of the increased space between the wheel units made available by the present invention.

By supporting the wheel on the half shaft at a point further from the longitudinal centerline of the vehicle than conventionally mounted wheels on axle spindles, greater vertical displacement of the wheel is achieved without greatly increasing the angularity of the half shaft. Accordingly, increased wheel travel is provided without the half shaft unduly intruding upon the hull of the vehicle and correspondingly diminishing the compartment space within the vehicle. Such arrangement further provides less intrusion of the wheels into the hull when the wheels are turned when steering. Typically, the wheels will swivel in an arc of about 26°. Such improvement is illustrated in FIGS. 20 and 21 in which FIG. 20 illustrates the amount of space available between a set of wheels of a prior art vehicle and FIG. 21 illustrates the increased amount of space available in a comparable vehicle utilizing wheel units embodying the present invention.

Although the wheel unit assembly has been described as being mounted on a platform consisting of a hull of monocoque construction, it is to be understood that the assembly is not limited to installation on such a platform and can be mounted on any desired platform. The platform may have any configuration depending upon its use requiring a wheel assembly having an independent suspension. The platform may consist of a conventional truck including a main frame, a cab mounted on the front end thereof and a body mounted on the frame behind the cab. The platform further may consist of a main frame and a cab and a flat bed mounted on the frame with or without a variety of implements mounted on the flat bed. In addition, although the invention has been described in connection with a platform consisting of a hull of monocoque construction having a specific design, such hull may consist of any suitable design.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A wheel suspension system for a vehicle having a body supported on a set of wheels each provided with a rim and an axle, comprising:
   a lower control arm pivotally connectable to a first portion of said body;
   an upper control arm pivotally connectable to a second portion of said body;
   a bracket connected to said upper control arm;
   an air spring disposed between said bracket and said body;
   a shock absorber having an end connected to said upper control arm and an opposite end connected to an upper movable plate portion of said air spring;
   a roller bearing having inner and outer races, disposed within said rim, coaxially relative to the rotational axis of said rim;
   a steering knuckle mounted on the outer race of said bearing, having a first portion pivotally connected to said lower control arm and a second portion pivotally connected to said upper control arm, defining a steering axis intersecting said rotational axis; and
   a hub member mounted on said inner race and connectable to an axle receivable through an opening provided in said steering knuckle,
   wherein said bearing is provided with a set of cylindrical rollers, the axis of each of which is inclined at an angle of 45° relative to the axis of said bearing and is inclined at an angle of 90° relative to the axis of a successive roller.

2. A system according to claim 1 wherein said steering knuckle is provided with an arm operatively connected to a steering system provided on said body.

3. A system according to claim 1 wherein at least a portion of said steering axis is disposed within said rim.

4. A system according to claim 3 wherein a lower portion of said steering axis is disposed within said rim.

5. A system according to claim 1 wherein said steering axis is inclined at an angle in the range of 7° to 9° relative to the vertical.

6. A system according to claim 1 wherein the connections of said steering knuckle to said upper and lower control arms comprise ball joint connections and wherein said steering axis intersects the centers of the ball portions thereof.

7. A system according to claim 1 wherein said lower control arm comprises a panel.

8. A system according to claim 7 wherein said panel has a triangular configuration.

9. A system according to claim 7 wherein said panel has a curved bottom surface.

10. A system according to claim 1 wherein said bracket includes a portion providing a platform disposed between said rim and a surface of a wheel well of said vehicle, and said air spring is disposed between said platform and said wheel well surface.

11. An assembly for a vehicle having a body supported on a set of wheels each having an upper control arm, comprising:
    a bracket pivotally connectable at a lower end thereof to said upper control arm, having a portion at an upper end thereof providing a platform;
    an air spring mounted on said platform and connectable to a surface of a wheel well of said vehicle;
    a shock absorber having a lower end connected to said upper control arm and an upper end connectable to an upper movable plate portion of said spring; and
    at least one guide means interconnecting said bracket and a movable member of said shock absorber.

12. An assembly according to claim 11 wherein said guide means comprises a least one rod extendable through a guide opening in a portion of an extendable portion of said shock absorber.

13. A wheel unit mountable on a body to form a vehicle comprising:
    a housing connectable to components of said body;
    a gearbox mounted on said housing and having an input shaft and a pair of transversely extending output shafts and each side of said housing having upper and lower control arms
    pivotally connected to said housing;
    a first support member pivotally connected to each of said upper and lower control arms, defining a steering axis;
    a roller bearing having an outer race mounted on said first support member, and an inner race;
    a second support member mounted on said inner race of said bearing and connectable to the hub portion of a wheel whereby said bearing will be disposed coaxially with the rotational axis of said wheel; and
    an axle having an inner end operatively connected to an output shaft of said gearbox, and
    an outer end extending through said bearing and connected to said second support member,
    wherein each of said upper control arms, a first support member connected thereto and an adjacent second support member includes a passageway communicable with a source of air under pressure with a wheel mounted on said adjacent second support member.

* * * * *